United States Patent [19]

Hakarine

[11] 4,002,495
[45] Jan. 11, 1977

[54] EXPLOSION-PROOF VENT BARREL FOR A BATTERY

[75] Inventor: Duane D. Hakarine, Minneapolis, Minn.

[73] Assignee: Gould Inc., Rolling Meadows, Ill.

[22] Filed: Feb. 12, 1976

[21] Appl. No.: 657,567

Related U.S. Application Data

[63] Continuation-in-part of Ser. No. 549,304, Feb. 12, 1975, abandoned.

[52] U.S. Cl. .................................................. 429/87
[51] Int. Cl.² ........................................ H01M 2/12
[58] Field of Search .............................. 136/177, 180

[56] References Cited
UNITED STATES PATENTS

| | | | |
|---|---|---|---|
| 3,466,199 | 9/1969 | Hennen | 136/177 |
| 3,507,708 | 4/1970 | Vignand | 136/177 |
| 3,879,227 | 4/1975 | Hennen | 136/177 |

*Primary Examiner*—John H. Mack
*Assistant Examiner*—H. A. Feeley
*Attorney, Agent, or Firm*—Leydig, Voit, Osann, Mayer & Holt, Ltd.

[57] ABSTRACT

An explosion-proof vent barrel having a tubular body, an electrolyte splash baffle and an electrolyte drain funnel molded integrally with one another, there being a porous flame-arresting disc telescoped into the body. Three barrels are ganged on a common frame which protects the flame-arresting discs against dirt and grease. In one embodiment, the underside surface of the frame is formed with a shallow channel to permit positive venting of the gases which diffuse through the arrestor discs. In another embodiment, both the discs and barrels are maintained in closely spaced relation to the underside of the frame for defining a positive escape area about substantially the entire periphery of the disc. In each instance, the depth of the positive vent escape area does not exceed 0.015 inches so as to permit positive venting while retarding the entrance of a flame into the space between the disc and frame.

25 Claims, 6 Drawing Figures

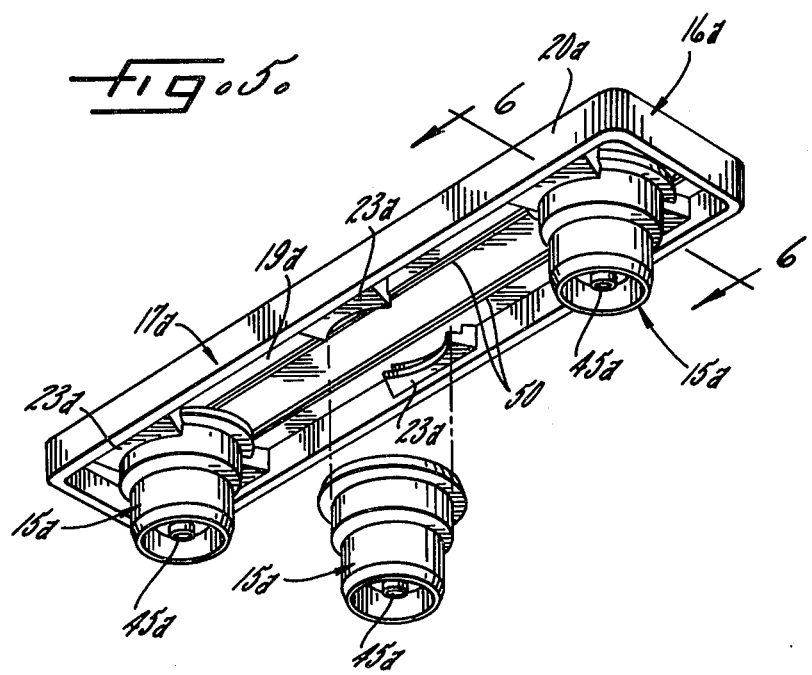
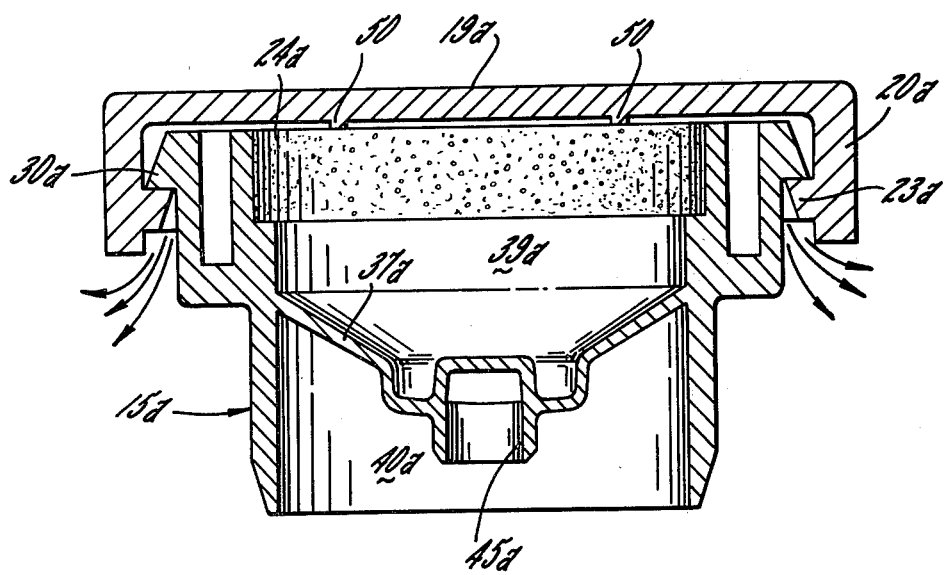

EXPLOSION-PROOF VENT BARREL FOR A BATTERY

DESCRIPTION OF THE INVENTION

This is a continuation-in-part of application Ser. No. 549,304, filed Feb. 12, 1975 now abandoned.

This invention relates generally to an explosion-proof vent barrel for an electrical storage battery and, more particularly, to a so-called gang vent in which two or more vent barrels are attached to a common frame for the purpose of venting multiple cells of the battery.

If ignited by a spark, a jet of gas escaping from the vent opening of a battery cell can cause an explosion which may damage or destroy the battery. In an effort to prevent such explosions, provisions have been made to vent the cell with a vent barrel which utilizes a porous flame-arresting element to diffuse the escaping gas and to retard the entrance of a spark or flame into the cell. In those instances where multiple barrels are ganged on a common frame, the internal gas from the ganged cells usually has been collected and vented through a single porous element.

The general aim of the present invention is to provide a new and improved explosion-proof vent barrel which lends itself to inexpensive production by high speed manufacturing and assembly techniques and which, at the same time, includes a porous flame-arresting element which is safely protected both from dirt and grease and from splashing electrolyte.

A further object is to provide an explosion-proof gang vent in which each cell is vented directly and individually through an associated flame arrestor in order to better protect against the danger of explosion. A correlated object is to make advantageous use of the frame of the gang vent to protect the flame arrestors against external dirt and grease and to captivate the flame arrestors against escape from the vent barrels.

A more detailed object is to provide an inexpensively molded vent barrel having an integral and uniquely located splash baffle for protecting the flame arrestor from sputtering electrolyte, the splash baffle co-acting with an integral funnel for draining the electrolyte back to the cell.

Other objects and advantages of the invention will become apparent from the following detailed description and with reference to the accompanying drawings, in which:

FIG. 5 is a perspective view of another embodiment of a gang vent according to the present invention; and FIG. 6 is an enlarged cross-section taken substantially along the line 6—6 in FIG. 5.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims. While ganging multiple vent barrels on a common frame comprises an advantageous embodiment of the present invention, it should be appreciated that a frame could be utilized with a single vent barrel if desired. Still further, while certain means are described for retaining the flame arrestor in its proper position in the vent barrel structure, any other suitable means such as, for example, assembling the arrestor in the barrel by spin welding, heat sealing, ultrasonic welding and the like could likewise be employed. Similarly, while illustrative means have been shown for providing a positive vent for the gas which diffuses through the arrestors, other functionally equivalent means could be utilized.

Figure 1:
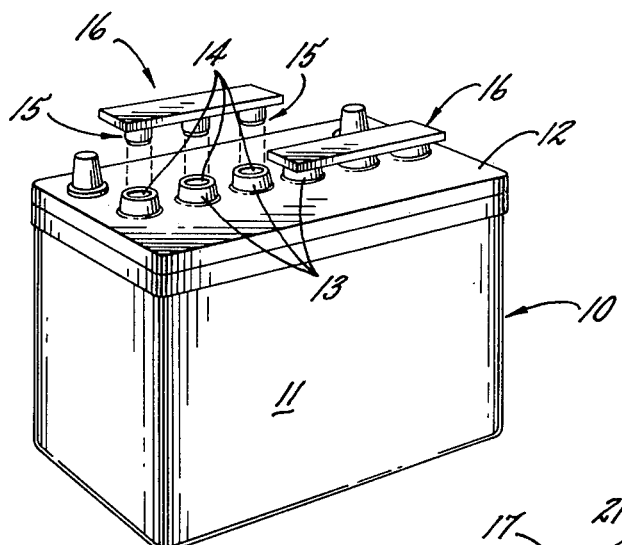
FIG. 1 is a perspective view of a battery equipped with a gang vent embodying the present invention with one of the vents being shown in exploded relationship with the battery.

Turning now to FIG. 1, there is shown an electrical storage battery 10 having a container 11 divided into cells and closed by a cover 12 formed with tubular bosses 13 which define vent openings 14 leading into the cells. In the illustrated construction, three side-by-side openings are adapted to be closed by a corresponding number of vent plugs or barrels 15 which form part of a gang vent 16 embodying the features of the present invention.

Herein, the gang vent 16 includes a one-piece frame 17 (FIGS. 2 and 3) having a substantially flat and rectangular top plate 19 and formed with a depending peripheral skirt 20. Spaced equally along the underside of the top plate and projecting inwardly from the longer sides of the skirt are three pairs of ribs 21 which serve to secure the vent barrels 15 to the frame. The ribs of each pair are located in opposing relation to one another and each includes an inwardly projecting lower lip 23 spaced downwardly from the top plate and having a concave inner surface, the inner surface of the ribs also being concave.

The gang vent may be made from any of a variety of plastic materials. Functionally, the material should be at least relatively acid-resistant and capable of serving the intended purpose under the temperature and other conditions to which the battery will be exposed. As representative examples, polymers such as high heat polystyrenes, polypropylene and copolymers, polyvinyl chloride, ABS materials and other similar materials may suitably be employed.

In accordance with one aspect of the present invention, each vent barrel 15 is primarily formed as an inexpensive, single-piece molding and is provided with a porous flame arrestor 24 (FIG. 3) which may be quickly and easily assembled to the molded part. When attached to the frame 17, the three barrels provide individual explosion-proof venting for the corresponding cells of the battery 10 and, in addition, the top plate 19 of the frame protects the flame arrestors from grease and dirt while also insuring that each arrestor will remain in assembled relation with its associated molded part.

More specifically, each vent barrel 15 includes a molded cylindrical tubular body (FIG. 3) sized to fit or telescope snugly but releasably in one of the vent openings 14. Its lower end portion is tapered downwardly and inwardly as indicated at 26 in FIG. 3 to facilitate insertion of the body into the opening. In addition to the primary functional requirements for the gang frame material, the material utilized for the vent barrel should allow formation of a vent barrel having a sufficient degree of flexibility to allow assembly into the frame as is described herein. The materials utilized for the frame are suitable as are various known polyethylene materials.

Figure 2:
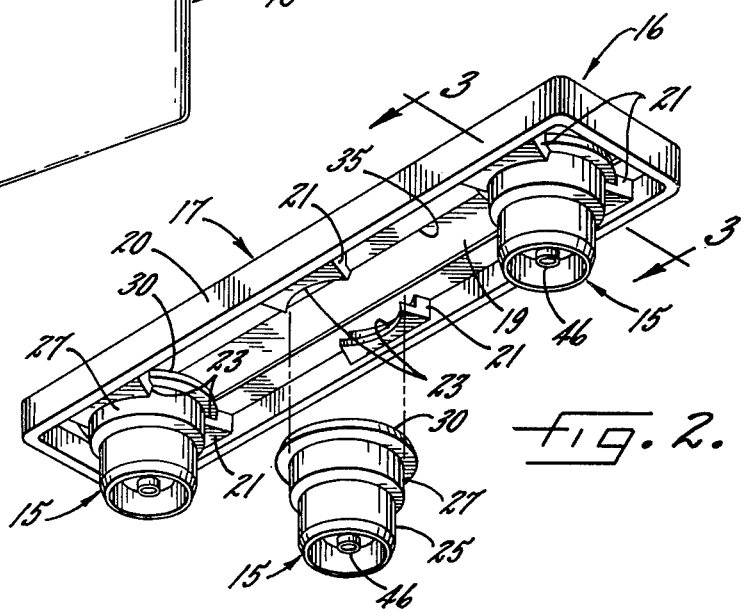
FIG. 2 is a perspective view of one of the gang vents and shows one of the vent barrels in exploded relationship with the vent frame.
Figure 3:
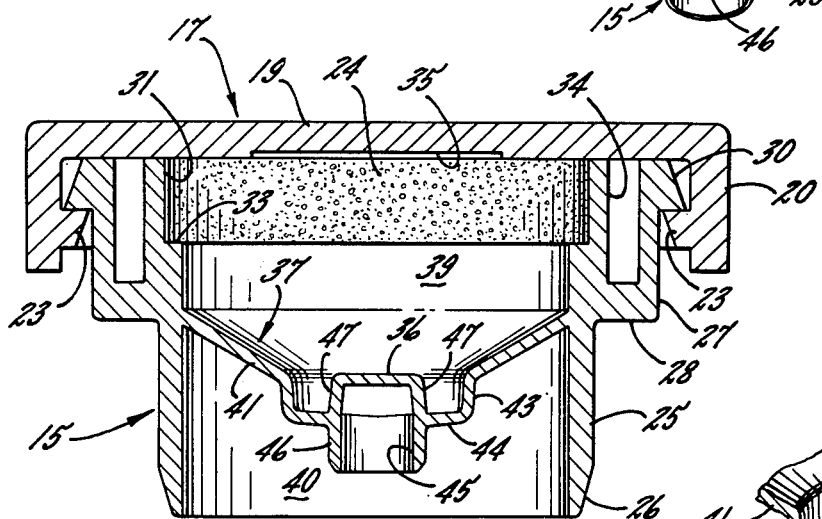
FIG. 3 is an enlarged cross-section taken substantially along the line 3—3 of FIG. 2.

Formed around the upper end portion of the body 25 is an enlarged collar 27 whose lower end 28 is adapted to seat against the upper side of the vent opening boss 13. A radially projecting flange 30 is formed around the upper end of the collar and coacts with the ribs 21 and the lips 23 to secure the barrel 15 to the frame 17. As shown in FIGS. 2 and 3, the flange is sandwiched between the underside of the top plate 19 and the upper sides of one opposing pair of lips 23 and is embraced by the concave surfaces of the ribs 21 while the concave surfaces of the lips embrace the outer cylindrical surface of the collar 27. Assembly of the barrel 15 to the frame 17 is effected by shifting the barrel lengthwise of the top plate to snap the collar between the lips. The ribs 21 and the lips 23 permit the barrels to shift through limited distances both lengthwise and broadwise of the top plate so that the bodies 25 of the barrels may automatically center themselves with respect to the vent openings 14.

Each flame arrestor 24 is in the form of a cylindrical disc (see FIG. 3) and may be made from various known materials employed for similar purposes. Suitable materials include, for example, polypropylene, ultra-high molecular weight polyethylene and fluorocarbon polymers (e.g., —Pennwalt's "Kynar," a polyvinylidene fluorine polymer). The materials should allow formation of a porous and gas permeable flame arrestor with a relatively uniform pore size distribution and having adequate resilience and toughness to typically allow processing through conventional die-cutting and assembly equipment without the employment of special procedures. The arrestor should have a mean pore size of from about 10 microns or perhaps less to about 100 microns. It has been found that arrestors have mean pore sizes in the range of about 10 microns or perhaps less to about 20 microns or so restrict electrolyte flow which retards electrolyte spilling in the event the battery is inadvertently tipped on its side or inverted for short periods of time. Preferably, and for normal use, pore sizes ranging from about 40 to about 60 microns provides optimum venting features and explosion protection. Utilizing arrestors with pore sizes ranging from about 60 to 100 microns provides the features of venting and explosion retardation.

In keeping with the invention, the flame arrestor 24 is assembled to the body 25 simply by telescoping the arrestor into a socket 31 (FIG. 3) formed in the upper end portion of the body, the lower end portion of the socket having an annular shoulder 33 which defines a seat for the lower side of the arrestor. While the arrestor could be cemented within the socket, it preferably is sized to fit or telescope into the socket with a relatively tight press-fit so as to simplify assembly of the arrestor. To facilitate press-fitting of the arrestor into the socket, an upwardly opening and circumferentially extending groove 34 is formed in the collar 27. The groove allows the circumferential wall of the socket to flex radially outwardly to accommodate the arrestor when the latter is pressed into the socket.

When the assembled barrels 15 are attached to the frame 17 in such manner, the top plate 19 closely overlies the arrestors 24 precluding any possibility of the arrestors escaping from the socket 31 and protecting the porous material of the arrestors against becoming clogged by dirt and grease. Accordingly, the arrestors will stay clean throughout the service life of the battery 10 so as to effectively diffuse the gases developed in the associated cells and retard the entrance of a flame into the cells if the battery should be exposed to an external flame or spark.

In carrying out another aspect of the invention, means are provided for maintaining a relatively small spatial separation between an underside surface of the top plate and at least a portion of the top surface of the arrestor so as to provide a positive vent for the gases which diffuse through the arrestors, while effectively retarding the entrance of the flame both into the battery cells and the space between the top plate and the arrestor. In the embodiment shown in FIGS. 1–4, a shallow longitudinally extending channel or groove 35 is formed in the underside of the top plate 19 and extends across each of the longitudinally spaced arrestors. The depth of the channel 35 preferably should be sufficiently small that in the event escaping gases should become ignited a flame would not be sustained in the area of the arrestor. It has been determined that the depth of the groove should not exceed 0.015 inches, and a depth of about 0.005 inches has been found to be a desirable spatial separation both for purposes of positive venting of gases through the arrestor and flame control.

In normal use or recharging of the battery, small quantities of hydrogen and oxygen gases being liberated from the battery may accumulate under the top of the frame. If these gases should become ignited, a small but harmless explosion may occur under the vent frame and in the vicinity of the opening defined by the groove. This explosion with its resultant shock waves tends to momentarily reverse the flow of gases through the groove and arrestor, but only long enough to prevent re-ignition of gases. Such small explosions, therefore, additionally enhance the explosion-proof characteristics of the vent by further retarding the entrance of a flame into the groove area.

If the gassing rate of the battery should reach an unusually high level, such as might be experienced if there were a defective voltage regulator or the battery were being exposed to a faster than normal charge, it is possible that the exiting gases could sustain continuous burning. In the case of such excessive gas discharge, the relatively small orifice defined by the groove 35 acts as a ribbon burner and effectively directs the flame away from the arrestor and barrel so as to prevent the entrance of the flame into the space between the arrestor and frame, thereby tending to protect the arrestor from early damage.

In further keeping with the invention, the interior of the body 25 is formed with a baffle 36 (FIGS. 3 and 4) for preventing liquid electrolyte from the cell from splashing upwardly against the lower side of the porous arrestor 24. In addition, and in accordance with an advantageous and optional feature of the present invention, provision is preferably made of a partition or funnel 37 having a generally downwardly sloping surface which enables upwardly splashing electrolyte to readily drain back downwardly into the cell.

In this instance, the funnel 37 divides the interior of the body 25 into upper and lower compartments 39 and 40 (FIG. 3) and includes a downwardly tapered frustoconical wall 41 molded integrally with the body. Molded integrally with the lower margin of the wall 41 is a substantially upright wall 43 whose lower margin is integral with a generally horizontal bottom wall 44. A hole 45 is formed vertically through the bottom wall 44 and is located at the upper end of a tubular protrusion 46 which depends from and is integral with the underside of the bottom wall. Gas from the cell is vented through the protrusion and the hole and into the upper compartment 39 for subsequent diffusion through the porous arrestor 24. The protrusion acts as a deflector to reduce upwardly splashing electrolyte through the hole.

Figure 4:
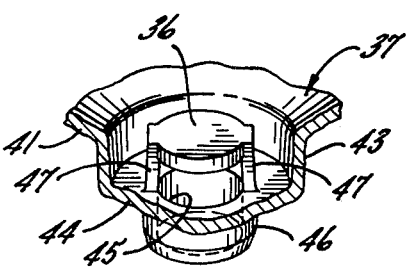
FIG. 4 is a fragmentary perspective view primarily showing the splash baffle of the vent barrel illustrated in FIG. 3.

The splash baffle 36 is spaced upwardly from and overlies the hole 45 to deflect upwardly escaping electrolyte back downwardly into the cell while still venting gas from the cell and into the upper compartment 39. As shown in FIGS. 3 and 4, the illustrative baffle is in the form of a circular disc having a diameter approximately the same as that of the hole. Two narrow webs 47 are molded integrally with the baffle and the upper side of the bottom wall 44 and are spaced diametrically from one another around the hole. The webs support the baffle above the hole but allow gas to flow through the hole and into the upper compartment.

From the foregoing, it will be apparent that the splash baffle 36 helps protect the porous flame arrestor 24 from becoming plugged with electrolyte. In addition, materials from within the battery cell, such as oxide particles and any other solid particles, are prevented from contacting and possibly plugging or obstructing the vent pores. Any electrolyte which does sputter upwardly past the baffle is readily drained back into the cell by virtue of the downwardly tapered wall 41 of the funnel 37.

Since the lower compartment 40 is defined by the open ended tubular end of the body 25 it will be seen that the end of the body can be sufficiently long for secure mounting within the cell opening, and by reason of its flexibility, will reliably seal the opening so that all escaping gases will pass through the arrestor. Furthermore, the funnel partition 37 can also be located relatively high in the barrel so as to minimize the amount of electrolyte that enters the upper compartment 39.

Turning now to FIGS. 5 and 6, there is shown another gang vent embodying the present invention wherein parts similar to those described above have been given similar reference numerals with the distinguishing suffix *a* added. The gang vent 16*a* similarly has an elongated frame 17*a* with a top plate 19*a* from which a plurality of longitudinally spaced barrels 15*a* are removably secured in depending fashion by frame lips 23*a* in the manner described above. The barrels 15*a* also are of identical construction to those described above, each including a tubular body portion 25*a* having a tapered partition or funnel 37*a* which divides the barrel body into an upper compartment 39*a* and a lower open ended compartment 40*a*. A flat cylindrical shaped arrestor 24*a* is seated in the upper end of the compartment 39*a*, and the funnel 37*a* is formed with a gas aperture 45*a* and a splash baffle 36*a*.

In accordance with still another aspect of the invention, means are provided for maintaining each arrestor 24*a* and the barrel 15*a* in closely spaced relation to the underside of the top frame plate 19*a* for defining a positive escape area about substantially the entire outer periphery of the arrestor. In the embodiment illustrated in FIGS. 5 and 6, such separating means includes a pair of small ribs 50 formed in the underside of the top plate and extending longitudinally along the length of the top frame plate.

The barrel 15*a* and arrestor disc 24*a*, as best shown in FIG. 6, are both in abutting relation to the ribs 50 and are held in place by the frame lips 23*a*. Since the arrestor disc 24*a* is seated in the upper end of the barrel so that its upper surface is flush with the end of the barrel 15*a*, the disc and barrel are uniformly spaced with respect to the underside surface of the top plate 19*a* so as to define an escape orifice about the entire periphery of the barrel. While two longitudinal ribs are utilized in the illustrated embodiment, it will be understood that additional ribs, or other equivalent means, could be used for maintaining the spacing of the disc and barrel with respect to the top frame plate.

The spacing between the top plate and the disc and barrel again should not exceed 0.015 inches, and desirable results are obtained with a spacing of only 0.005 inches. As previously indicated, in normal use of the battery small quantities of escaping gases may accumulate under the top frame plate and cause harmless explosions so as to momentarily reverse the gas flow and prevent sustained ignition of the exiting gases.

In the event that the rate of gassing within the battery reaches such a high level that even the vented gases will sustain continued burning if ignited, the small orifice defined by the spacing between the frame and the arrestor and barrel will again act as a ribbon burner and direct the flame outwardly away from the arrestor and barrel. As a further feature of this embodiment of the invention, such continuous burning would take place about substantially the entire periphery of the barrel and, as a result, at least a portion of any flame would be directed outwardly to the sides of the vent frame and burn upwardly away from the battery surface as indicated by the arrows in FIG. 6. Not only does such sideward and upward direction of the flame away from the battery surface tend to minimize damage to the battery, but the black smoke that inherently results from such burning serves as an early warning of the danger so as to permit prompt correction of the problem.

From the foregoing, those familiar with this art will appreciate that the vent barrel of the present invention is well suited for economical high volume production because the body, the baffle and the funnel of each barrel all are molded as an integral unit and because the flame arrestor can be assembled into the socket in the body. Although three barrels are ganged together on a common frame, the barrels are effective in preventing explosion of the battery since the gas from each cell is vented through an individual flame arrestor. Furthermore, the relatively small spacing provided between each arrestor and the underside of the frame permits positive venting of the exiting gas and prevents the entrance of a flame into the space between the arrestor and frame for further protection of the arrestor from damage in the event the escaping gases should become ignited.

I claim as my invention:

1. An explosion-proof vent for closing the cell opening of a storage battery comprising a top frame plate and a tubular body releasably mounted in depending fashion from said top plate, said tubular body being molded of plastic for sealing engagement in said cell opening, said body defining a compartment with an aperture therein to permit gas from within said battery cell to flow into said compartment, a disc made of porous material interposed between an upper end of said body and said frame for covering the upper end of said body compartment, and means for maintaining a spatial separation of less than 0.015 inches between said top frame plate and at least a portion of said disc for allowing gases within said compartment to readily escape through said disc while retarding the entrance of a flame into the space between said frame plate and disc.

2. An explosion-proof vent as defined in claim 1 in which said separation means includes at least one rib formed in the underside of said frame plate for maintaining substantially the entire upper surface of this said disc in spaced relation with the underside of said frame plate.

3. An explosion-proof vent barrel as defined in claim 2 including means for maintaining said barrel at the same spaced relation to said frame as said disc is maintained.

4. An explosion-proof vent barrel as defined in claim 1 in which said separation means includes a channel formed on the underside of said frame plate transverse to said disc.

5. An explosion-proof vent barrel as defined in claim 1 in which said gas aperture is formed in a downwardly tapered funnel partition molded integrally with said body, and a splash baffle molded integrally with said funnel and spaced upwardly from and overlying said aperture to direct upwardly escaping liquid back downwardly toward said aperture.

6. An explosion-proof gang vent for a storage battery, said vent comprising a frame having a generally horizontal top plate, a plurality of vent barrels, means releasably securing said vent barrels in longitudinally spaced relation to the underside of said top plate, said barrels each comprising a tubular body molded of plastic, said body of each barrel defining a compartment with an aperture therein to permit gas from said battery to flow into the interior of said compartment, a disc positionable at the upper end portion of each said body in underlying relation with said top plate for covering the upper end of said compartment, said discs being made of porous material capable of allowing gas to escape upwardly out of said body while retarding the downward entrance of flame into the battery, and means for maintaining a relatively small spatial separation between the entire upper surface of each said disc and the underside of said top plate so as to define an escape area about substantially the entire outer periphery of said disc for gases exiting from said compartment and disc.

7. An explosion-proof gang vent as defined in claim 6 including means for maintaining a relatively small spatial separation between each of said barrels and the underside of said top frame plate.

8. An explosion-proof gang vent as defined in claim 7 in which said means for maintaining a spaced relation between said top plate and said disc and barrels includes at least one narrow rib formed in the underside of said top plate.

9. An explosion-proof gang vent as defined in claim 7 in which said means for maintaining a spaced relation between said top plate and said discs and barrels includes a pair of narrow ribs formed in the underside of said top plate.

10. An explosion-proof gang vent as defined in claim 9 in which said ribs maintain a spatial separation between said discs and barrels and the underside surface of said top plate of less than 0.015 inches.

11. An explosion-proof gang vent as defined in claim 10 in which said ribs maintain a spatial separation between said discs and barrels and the underside surface of said top plate of about 0.005 inches.

12. An explosion-proof gang vent as defined in claim 10 in which said ribs extend longitudinally across each of said discs and barrels.

13. An explosion-proof gang vent for a storage battery, said vent comprising a frame having a generally horizontal top plate, a series of vent barrels attached to said frame and spaced along and depending from the underside of said plate, each of said barrels comprising:
  a. a tubular body molded of plastic,
  b. a downwardly tapered funnel molded integrally with said body and located within the interior of the body so as to divide said interior into upper and lower compartments,
  c. a generally vertical hole in the lower end portion of said funnel to permit gas from said battery to escape into said upper compartment,
  d. a splash baffle spaced upwardly from and overlying said hole to direct upwardly escaping liquid back downwardly toward said hole,
  e. angularly spaced webs extending between and molded integrally with said baffle and the lower end portion of said funnel to support said baffle above said hole while still permitting gas to escape into said upper compartment, and
  f. a disc telescoped snugly into the upper end portion of said body in underlying relation with said top plate and covering the upper end of said upper compartment, said disc being made of porous material capable of allowing gas to escape upwardly out of said upper compartment while retarding the downward entrance of flame into the upper compartment.

14. An explosion-proof gang vent as defined in claim 13 in which each funnel is of circular cross-section and includes
  a. a downwardly and inwardly inclined upper wall,
  b. a substantially upright lower wall integral with the lower margin of said upper wall, and
  c. a substantially horizontal bottom wall integral with the lower margin of said lower wall,
said hole being formed through said bottom wall, and said webs projecting upwardly from said bottom wall and being located on diametrically opposite sides of said hole.

15. An explosion-proof gang vent as defined in claim 13 in which the upper end portion of the interior of each body is defined by a socket having an internal annular shoulder at its lower end, said disc being telescoped into said socket with a press-fit and being seated against said shoulder, and said lower compartment is defined by a relatively flexible open-ended tubular portion.

16. An explosion-proof gang vent as defined in claim 13 further including a channel formed in the underside of said top plate, said channel extending across each disc and extending outwardly beyond the periphery of the upper end of each body so as to define a passage for gas escaping through said disc.

17. An explosion-proof vent barrel for closing a cell opening of a storage battery comprising a tubular body molded of plastic, a downwardly tapered funnel partition disposed within the interior of said body and dividing said interior into upper and lower compartments, said tapered partition being formed with a generally vertical hole in the lower end thereof to permit gas from said battery to escape into said upper compartment, said lower compartment being defined by an elongated tubular portion adapted for insertion into a bottom cell opening, the upper end portion of the interior of said body being defined by a socket having an internal annular shoulder at its lower end, a disc telescoped snugly into said socket and seated against said shoulder so as to cover the upper end of said upper compartment, and said disc being made of porous material capable of allowing gas to escape upwardly out of said upper compartment while retarding the downward entrance of flame into the upper compartment.

18. An explosion-proof vent as defined in claim 17 in which said tubular portion that defines said lower compartment is a relatively flexible open-ended extension of said body.

19. An explosion-proof vent barrel as defined in claim 17 in which an upwardly opening groove is formed in the upper end portion of said body and extends circumferentially around said socket to allow the wall of said socket to flex radially outwardly when said disc is telescoped into said socket.

20. An explosion-proof vent barrel as defined in claim 17 further including a splash baffle molded integrally with said funnel and spaced upwardly from and overlying said hole to direct upwardly escaping liquid back downwardly toward said hole.

21. An explosion-proof vent barrel as defined in claim 20 further including angularly spaced webs extending between and molded integrally with said baffle and the lower end portion of said funnel to support said baffle above said hole while still permitting gas to escape into said upper compartment.

22. An explosion-proof vent barrel as defined in claim 21 in which said funnel is of circular cross-section and includes
   a. a downwardly and inwardly inclined upper wall,
   b. a substantially upright lower wall integral with the lower margin of said upper wall, and
   c. a substantially horizontal bottom wall integral with the lower margin of said lower wall,
said hole being formed through said bottom wall, and said webs projecting upwardly from said bottom wall and being located on diametrically opposite sides of said hole.

23. An explosion-proof gang vent for a storage battery, said vent comprising a frame having a generally horizontal top plate, a plurality of vent barrels, means releasably securing said vent barrels in longitudinally spaced relation to the underside of said top plate, said barrels each comprising a tubular body molded of plastic, a downwardly tapered funnel molded integrally with said body and formed with a hole in its lower end portion to permit gas from said battery to escape into the interior of said body and to further permit any liquid that splashes through said hole to be returned to said battery, a disc telescoped snugly into an upper end portion of said body in underlying relation with said top plate and covering the upper end of said body, said disc being made of porous material capable of allowing gas to escape upwardly out of said body while retarding the downward entrance of flame into the battery, and said top plate being formed with a channel in its underside extending across each said disc and outwardly beyond the periphery of the upper end of each body so as to define a passage for gas escaping through said body.

24. An explosion-proof gang vent barrel as defined in claim 23 further including a splash baffle molded integrally with said funnel and spaced upwardly from and overlying said hole to direct upwardly escaping liquid back downwardly toward said hole.

25. An explosion-proof gang vent as defined in claim 23 in which said barrels each are formed with a radially extending gripping flange about an upper end thereof, and said means for securing each said barrel includes a pair of lips integrally formed in the underside of said top plate on opposite sides of said channel for releasably engaging said barrel flange.

* * * * *